United States Patent [19]

Kogge et al.

[11] Patent Number: 4,912,707
[45] Date of Patent: Mar. 27, 1990

[54] CHECKPOINT RETRY MECHANISM

[75] Inventors: Peter M. Kogge, Endicott, N.Y.;
Khoan T. Truong, Centreville, Va.;
Dale A. Rickard, Manassas, Va.;
Robert L. Schoenike, Warrenton, Va.

[73] Assignee: International Business Machines Corporation, Armonk, N.Y.

[21] Appl. No.: 235,345

[22] Filed: Aug. 23, 1988

[51] Int. Cl.[4] .............................................. G06F 11/00
[52] U.S. Cl. ....................................... 371/12; 364/200
[58] Field of Search ................... 371/12, 19, 14, 9.1, 371/7, 16.5, 16.1; 364/200, 900

[56] References Cited

U.S. PATENT DOCUMENTS

| | | | |
|---|---|---|---|
| 3,533,082 | 1/1968 | Schnabel et al. | 364/200 |
| 3,539,996 | 1/1968 | Bee et al. | 364/200 |
| 3,736,566 | 5/1973 | Anderson et al. | 364/200 |
| 3,786,430 | 1/1974 | Hajdu et al. | 364/200 |
| 4,044,337 | 8/1977 | Hicks et al. | 364/200 |
| 4,697,266 | 9/1987 | Finley | 364/200 |
| 4,703,481 | 10/1987 | Fremont | 364/200 |
| 4,755,997 | 7/1988 | Takahashi | 371/19 |
| 4,819,232 | 4/1989 | Krings | 371/12 |
| 4,852,092 | 7/1989 | Makita | 371/12 |

*Primary Examiner*—Michael R. Fleming
*Attorney, Agent, or Firm*—John E. Hoel

[57] ABSTRACT

An improved checkpoint retry mechanism is disclosed which automatically updates checkpoint addresses to enable the retry of instruction sequences for shorter segments of recently executed code, in response to the detection of an error since the passage of the current checkpoint. It does this by updating three different types of checkpoint addresses, a first checkpoint address for the instruction which follows a memory write or I/O write operation, a second type checkpoint address for the first instruction in an interrupt service routine, and a third type checkpoint address for the first instruction in an interrupted routine following an interrupt event. The resulting checkpoint retry mechanism is more efficient and faster because it adaptively updates the checkpoint address to reduce the size of code segments which must be reexecuted during retry operations. The invention operates to avoid memory corruption and erroneous I/O outputs during retry operations and protects from erroneous retry sequences.

12 Claims, 5 Drawing Sheets

CHECKPOINT RETRY MECHANISM

BACKGROUND OF THE INVENTION

1. Technical Field

The invention disclosed broadly relates to data processing systems and more particularly relates to improvements in recovery from fault detection in data processing systems.

2. Background Art

Data processing systems have historically suffered from both soft errors and hard errors. Soft errors are usually defined as those deviations from the expected output which occur because of electrical noise or other randomly occurring sources which result in nonreproducible fault syndromes. Hard errors are typically associated with electrical components or mechanical component failures producing errors which are reproducible. Many arrangements for fault tolerant data processing systems have been developed in the prior art. Typical examples of fault tolerant systems is the provision of two or more identical data processing elements operating on the same instruction stream and having their outputs compared with one another. When a difference is detected in the outputs of a pair of data processing elements, it can be inferred that either a soft error or a hard error has occurred. Typically in the prior art, the data processors are then restarted and the instruction stream is executed in a stepwise manner until the error is detected again. If there is no error occurring, then the initial error determination was that of a soft error. If the error is repeated in the stepwise manner, then the instruction at which the error occurs can be identified. This prior art approach to the retrial of instructions after the detection of a fault is a lengthy one. The prior art has not found suitably efficient and fast techniques for the retry of instructions after fault detection.

OBJECTS OF THE INVENTION

It is therefore an object of the invention to provide an improved instruction retry mechanism.

It is another object of the invention to provide an improved instruction retry mechanism which is more efficient than those provided in the prior art.

It is still a further object of the invention to provide an improved instruction retry mechanism which enables the retrial of short segments of recently executed code.

It is still a further object of the invention to provide an instruction retry mechanism which minimizes the chances of memory corruption by erroneously overwriting the memory.

It is yet a further object of the invention to provide an improved instruction retry mechanism which minimizes erroneous outputs to storage media or printers.

It is yet a further object of the invention to provide an improved instruction retry mechanism which more effectively protects from erroneous retry sequences.

SUMMARY OF THE INVENTION

These and other objects, features and advantages of the invention are accomplished by the checkpoint retry mechanism disclosed herein. The invention is applied in a data processor which includes an instruction memory containing a sequence of executable instructions. The data processor will also include an arithmetic logic unit which operates in response to the instructions so as to carry out arithmetic and logical operations. The data processor can also include a status register for storing the current status of the arithmetic logic unit and the plurality of general purpose registers accessible by the arithmetic logic unit for storing current operand and address values.

The improved checkpoint retry mechanism in the data processor will include an instruction decoder which has an input connected to an output of the instruction memory for decoding instructions accessed from the memory. The instruction decoder will include a write decode output, an interrupt decode output and an interrupt return decode output. The instruction decoder will also include an output connected to a control input of the arithmetic logic unit. The instruction memory includes an address register for storing the address of the next instruction to be accessed.

The checkpoint retry mechanism further includes a checkpoint address register for storing the address of the first instruction following a write instruction accessed from the instruction memory, this being a first type checkpoint address.

The instruction memory address register has an input connected to an interrupt vector address mechanism such as a vector table, for storing the address of the first instruction in a service routine which is pointed to by an interrupt instruction accessed from the instruction memory or alternately which is pointed to when an externally generated interrupt occurs. The address of the first instruction in the service routine is loaded into the checkpoint address register, as a second type checkpoint address which occurs in response to accessing an interrupt instruction or the occurrence of an interrupting event.

An interrupt return stack is included in the data processor for storing the address of a first instruction in an interrupted program which occurs after an interrupt instruction is executed or after the occurrence of an interrupting event. The address of the first instruction in an interrupted program after the occurrence of an interrupt instruction or the occurrence of an interrupting event, is loaded into the checkpoint address register as a third type checkpoint address which occurs in response to the accessing of an interrupt return instruction from the instruction memory at the end of the service routine.

An error checker is included in the checkpoint retry mechanism, which has an input connected to an output of the arithmetic logic unit, for detecting errors occurring in the arithmetic logic unit. The contents of the checkpoint address register are transferred to the instruction memory address register in response to the error checker detecting an error in the operation of the arithmetic logic unit. This results in the contents of the instruction memory address register becoming the checkpoint address which is used for retrying the sequence of instructions following the current checkpoint address value in response to the detection of an error.

In this manner, checkpoint addresses are automatically updated to enable the retry of instruction sequences for shorter segments of recently executed code, in response to the detection of an error which has occurred since the passage of the current checkpoint.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
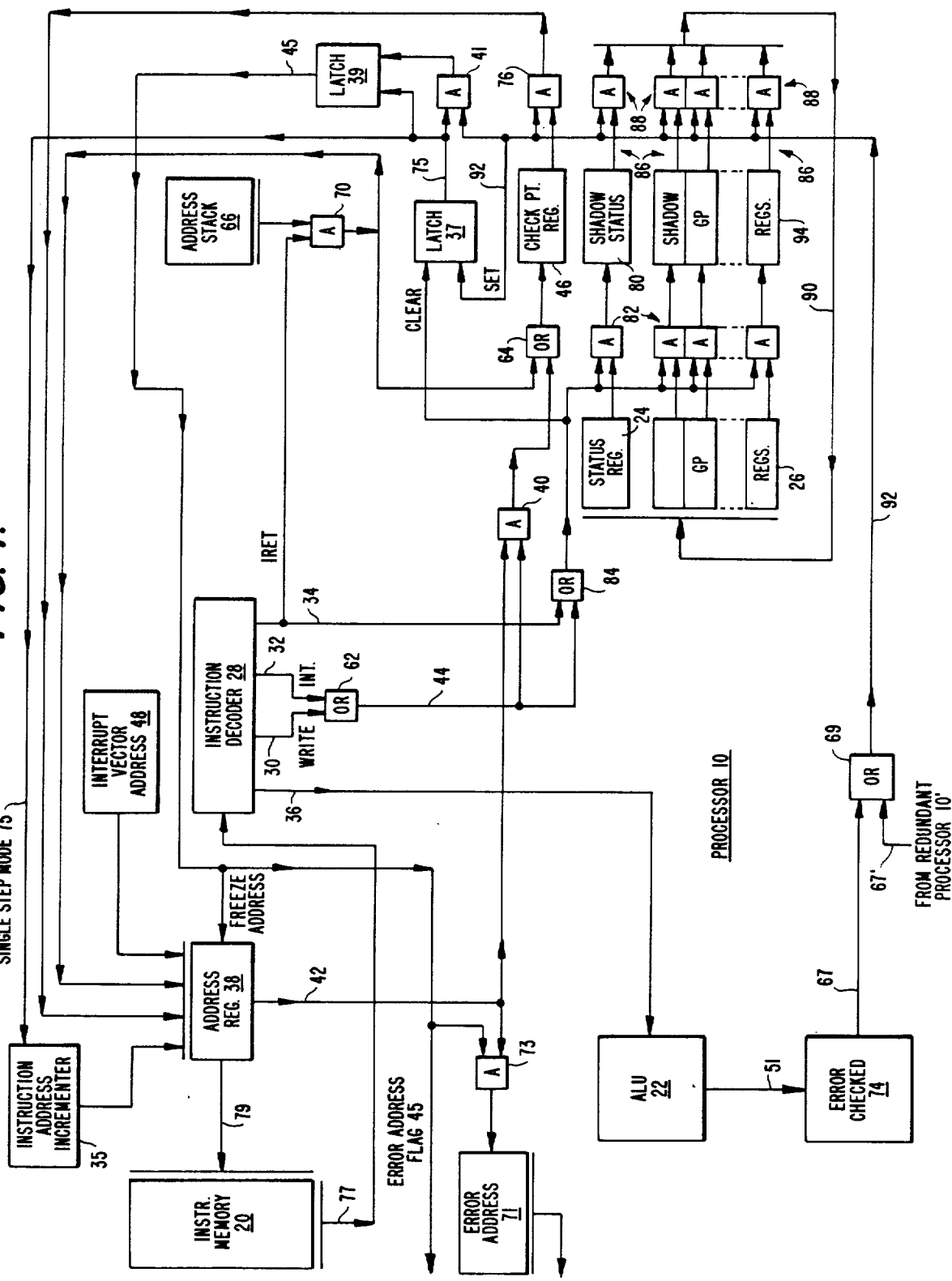
FIG. 1 is a functional block diagram of the improved checkpoint retry mechanism.

The improved checkpoint retry mechanism is shown in an overall functional block diagram in FIG. 1. The invention finds application in data processors which include an instruction memory 20 containing a sequence of executable instructions, an arithmetic logic unit 22 which operates in response to the instructions to carry out arithmetic and logical operations, a status register 24 for storing the current status of the arithmetic logic unit 22, and a plurality of general purpose registers 26 which are accessible by the arithmetic logic unit 22, for storing current operand and address values.

The improved checkpoint retry mechanism shown in FIG. 1 includes an instruction decoder 28 which has an input connected to an output of the instruction memory 20, for decoding the instructions which are accessed therefrom. Also included with the instruction decoder 28 is a write decode output 30, an interrupt decode output 32, and an interrupt return decode output 34. The instruction decoder 28 further includes an output connected over line 36 to a control input of the arithmetic logic unit 22.

The instruction memory 20 includes an address register 38 for storing the address of the next instruction to be accessed from the instruction memory 20.

The improved checkpoint retry mechanism of FIG. 1 further includes a first two input AND gate 40 which has a first input 42 connected to an output of the instruction memory address register 38 and it has a second input 44 connected through the OR gate 62 to the write decode output 30 of the instruction decoder 28.

Figure 2:
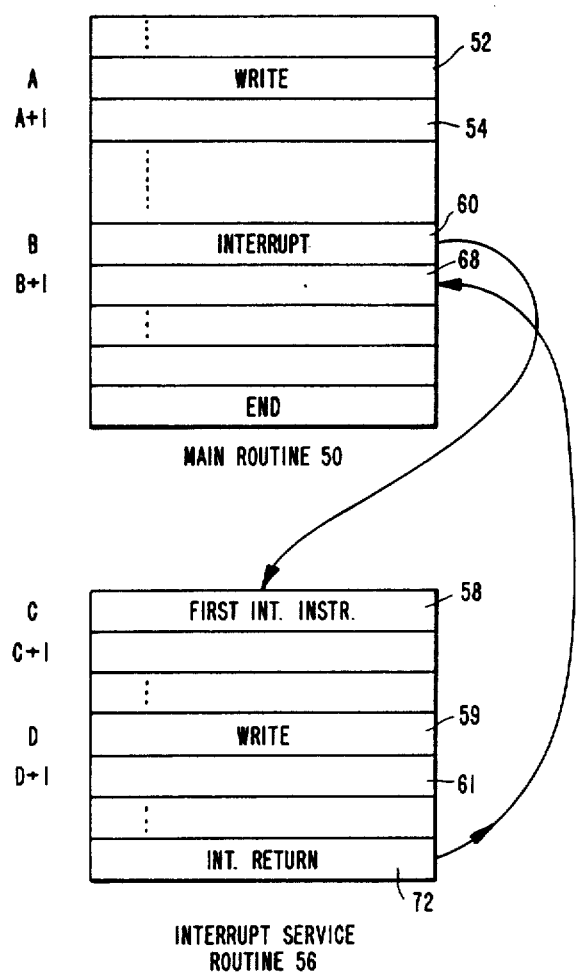
FIG. 2 is an example of the contents of the instruction memory 20, which illustrates the operation of the improved checkpoint retry mechanism.

FIG. 2 shows the contents of the instruction memory 20, as an example which will illustrate the operation of the improved checkpoint retry mechanism. Included in the instruction memory 20 is a main routine 50 and an interrupt service routine 56. The memory is organized as sequentially addressed storage locations and the instructions in the main routine 50 can occupy a first contiguous memory space and the instructions in the interrupt service routine 56 can occupy a second separate contiguous memory space, for example. As is well-known in the prior art, the address for the location of routines can be relocated and partitioned for various applications. In the arrangement of the contents for the instructions in FIG. 2, it is seen that the main routine 50 includes a sequence of instructions with a write instruction 52 at an address A followed by a next instruction 54 at address A+1. The main routine 50 further includes at a later portion and interrupt instruction 60 at address location B followed by a next instruction 68 at address location B+1. The interrupt service routine 56 includes a first interrupt instruction 58 at address C which is the address pointed to by the interrupt instruction 60 in the main routine 50. It is within the scope of the invention that instead of having a software interrupt instruction 60 at address B, a hardware generated interrupt can occur at the point of execution of the instruction 60 at address B in the main routine 50. The interrupt service routine 56 further includes a write instruction 59 at address D followed by a next instruction 61 at address D+1. The interrupt service routine 56 will terminate with an interrupt return instruction 72 which will return the execution to the instruction 68 at address B+1 in the main routine 50. Typically this is accomplished by having saved the address B+1 for the instruction 68 at the time that the interrupt 60 occurred during the execution of the main routine 50.

The improved checkpoint retry mechanism of FIG. 1 further includes a checkpoint address register 46 which has an input connected through OR gate 64 to the output of the first AND gate 40, for storing the address A+1 of the first instruction 54 following the write instruction 52 at address A which has been accessed from the instruction memory 20 as shown in FIG. 2. In accordance with the invention, the storage of the address A+1 in the checkpoint address register 46 is a first type checkpoint address which is associated with the execution of a write instruction. Such a write instruction can be for the writing of information into the instruction memory or into the data memory of the data processor. Alternately, the write instruction 52 can be for the writing of output information to an I/O unit such as a disk storage, a tape storage or alternately a printer or a display device. The object of the first type checkpoint address is to provide a point at which retrial can be initiated if an error is detected in the operation of the arithmetic logic unit 22 prior to the execution of another subsequent write instruction, or an interrupt instruction or event. In accordance with the invention, this minimizes the chances that a retrial will cause the corruption of the memory or the state of an I/O device. Every time a write instruction such as the instruction 52 in the main routine 50 or the instruction 59 in the interrupt service routine 56 is executed, the checkpoint address register 46 will have an updated value stored therein which is the address of the next occurring instruction. In accordance with the invention, this will enable short segments of recently executed code to be retried in the event of the detection of an error.

The instruction memory address register 38 has an input connected to an interrupt vector address means 48 which can be for example a vector address table located elsewhere in the instruction memory or data memory of the data processor. An example of the operation of vector address tables is described in the copending U.S. patent application Ser. No. 770,541, filed Aug. 29, 1985 by Bradly J. Konopik, et al., entitled "Multiple Interrupt Sharing," assigned to the IBM Corporation and incorporated herein by reference for its explanation of interrupt operations. The interrupt vector address means 48 will store the address C of the first instruction 58 in the service routine 56 of FIG. 2, which is pointed to by the interrupt instruction 60 in the main routine 50 which has been accessed from the instruction memory 20, or alternately which is pointed to as a result of the occurrence of an interrupting event.

The first AN-D gate 40 has a second input 44 connected through the OR gate 62 to the interrupt decode output line 32 of the instruction decoder 28, for enabling the address C of the first instruction 58 in the service routine 56 which has been transferred from the interrupt vector address means 48 to the instruction memory address register 32, to be loaded through the OR gate 64 into the checkpoint address register 46. In accordance with the invention this is a second type checkpoint address which occurs in response to the accessing of an interrupt instruction 60 from the instruction memory 20 or alternately which occurs in response to the occurrence of an interrupting event at or during the execution of instruction 60 in the main routine 50. In this manner, if a fault is detected in the operation of the ALU 22 following the execution of the first interrupt instruction 58 at address C in the service routine 56, the retry of instructions will start from the first instruction 58. In this manner, short segments of recently executed code can be retried when an error has been detected.

The data processor shown in FIG. 1 can further include an interrupt return address stack 66 for storing the address B+1 of the instruction 68 in the interrupted program 50 which occurs after the interrupt instruction 60 when the interrupt took place. The checkpoint retry mechanism of FIG. 1 further includes a second AND gate 70 which has a first input connected to an output of the address stack 66 and a second input connected to the instruction return decode output 34 of the instruction decoder 28. The second AND gate 70 has an output connected through the OR gate 64 to the checkpoint address register 46, for loading the first instruction 68 at address B+1 in the interrupted program 50 after the occurrence of the interrupt instruction 60 at address B, into the checkpoint address register 46. In accordance with the invention, this is a third type checkpoint address which occurs in response to the accessing of an interrupt return instruction 72 in the service routine 56, from the instruction memory 20. In this manner, if an error is detected in the operation of the ALU 22 after the execution of the instruction 68 at address B+1 in the main routine 50, retry of instructions will start from the instruction 68 at address B+1. Thus, short segments of recently executed code will be retried in the event that an error is detected in the operation of the ALU 22.

The checkpoint retry mechanism of FIG. 1 includes an error checker 74 which has an input connected to an output 51 of the arithmetic logic unit 22, for detecting errors occurring in the arithmetic logic unit 22. There are several different techniques which can be employed for the error checker 74. One technique is to have two arithmetic logic units 22 and 22' which operate in parallel to execute the same instruction stream being output from the instruction memory 20. The outputs of the pair of arithmetic logic units 22 and 22' can then be compared and if there is a difference detected in the outputs, it can be inferred that an error has occurred in one of the two arithmetic logic units. This can cause the output of an error detection signal from the error checker 74 on the output line 92. Other examples of error checking techniques which can be employed for the error checker 74 will be discussed later in this patent application. A third AND gate 76 in FIG. 1 has a first input connected to the output of the checkpoint address register 46 and a second input connected to an output of the error checker 74, for transferring the contents of the checkpoint address register 46 to the instruction memory address register 38, in response to the error checker 74 detecting that an error has occurred in the operation of the arithmetic logic unit 22. The resulting contents of the instruction memory address register 38 will now be the current value of the checkpoint address for retrying the sequence of instructions following the current checkpoint address value.

In this manner, checkpoint addresses are automatically updated to enable the retry of instruction sequences for shorter segments of recently executed code, in response to the detection of an error which has occurred since the passage of the current checkpoint.

FIG. 1 further shows a shadow status register 80 for storing the contents of the status register 24 when a new checkpoint address value is stored in the checkpoint address register 46. A fourth AND gate 82 has a first input connected to an output of the status register 24 and a second input connected through the OR gate 84 and through the OR gate 62 for logically ORing the write output 30, the interrupt output 32 and the interrupt return output 34 of the instruction decoder 28. The fourth AND gate 82 has an output connected to an input of a shadow status register 80, for loading the contents of the status register 24 into the shadow status register 80, when the checkpoint address register 46 has a new checkpoint address value stored therein. The shadow status register 80 has an output 86 which is coupled through the AND gates 88 to input 90 of the status register 24, for transferring the contents of the shadow status register 80 to the status register 24 when the error checker 74 detects the occurrence of an error in the arithmetic logic unit 22 and outputs a signal on line 92.

FIG. 1 shows a plurality of shadow general purpose registers 94 for storing the contents of the plurality of general purpose registers 26 through AND gate 82 when a new value for the checkpoint address has been stored in the checkpoint address register 46, in a similar manner to that described for transferring the contents of the status register 24 to the shadow status in register 80. The shadow general purpose registers 94 have an output 86 coupled through the AND gate 88 to the line 90 of the general purpose registers 26 for transferring the contents of the shadow general purpose registers 94 to the general purpose registers 26 in response to the error checker 74 outputting the output signal 92 which indicates the occurrence of an error in the arithmetic logic 22.

The invention results in automatically updating checkpoint addresses to enable the retry of instruction sequences for shorter segments of recently executed code in response to the detection of an error which has occurred since the passage of the current checkpoint. This results in a more efficient and faster checkpoint retry operation which avoids the problems of memory corruption and erroneous I/O outputs. The invention also operates to protect from erroneous retry sequences.

FIG. 1 shows an additional feature of the invention which is used after an error has been detected and the address register 38 has been loaded with the checkpoint retry address. A single step instruction address incrementer 35 has an output connected to the address register 38. An error latch 37 has an input connected to the output line 92 from the error checker 74 and it has an output 75 connected to an input of the instruction address incrementer 35. When the error checker 74 detects that an error has occurred, the signal on line 92 sets the latch 37 and the signal 75 from the latch 37 to the instruction address incrementer 35 indicates the commencement of a single stepping mode. When the address register 38 has the checkpoint retry address loaded therein, the instruction corresponding to the checkpoint retry address is accessed from the instruction memory 20 and is executed by the ALU 22. Then, the instruction address incrementer, under the control of the single-step mode signal 75 from the latch 37, increments by one, the value of the address in the address register 38. Thus, the next instruction in the instruction memory 20 is accessed and is executed in the ALU 22 in a sequential stepwise manner, until the instruction is accessed which causes the error condition to occur once again. When the error checker 74 outputs its second error detection signal on line 92, this signifies that the error initially detected has been detected again and the signal on line 92 is combined in the AND gate 41 with the on-state output from the latch 37, resulting in setting the latch 39 which is the error address flag latch. The error address flag latch 39 has an output 45 which signals that the error address currently in the address register 38 is the address of instruction causing the error which has been detected. In order to prevent the address register 38 from changing its value, an inhibit line from the output of the latch 39 is applied to the address register 38, thereby freezing the address contents therein to be that of the instruction causing the error which is detected by the error checker 74. When the flag signal 45 occurs for the error address flag output of latch 39, this signal can be used to enable AND gate 73 to pass the error address from the address register 38 to the error address register 71, making it available. A software branch can be made to an error analysis routine or the value of the address for the error producing instruction can be displayed or printed so that a diagnostic programmer can perform error maintenance.

If an error is detected for a first time and during the first retry the error is not repeated, it is assumed that the error is a soft error. In this circumstance, when the instructions are executed down to the next checkpoint such as the address of an instruction following a next write instruction, for example, the OR gate 64 will output a signal as previously described. The OR gate 64 outputs a signal for loading the checkpoint register 46 and the signal output from the OR gate 84 will be the clear input of the latch 37 to reset that latch. In this manner, the execution of the program will continue in a normal manner, no longer in the stepwise sequential manner following the detection of the first occurrence of the error. This is because there is no longer a single-step mode signal 75 output from the latch 37 to the instruction address incrementer 35.

Figure 3:
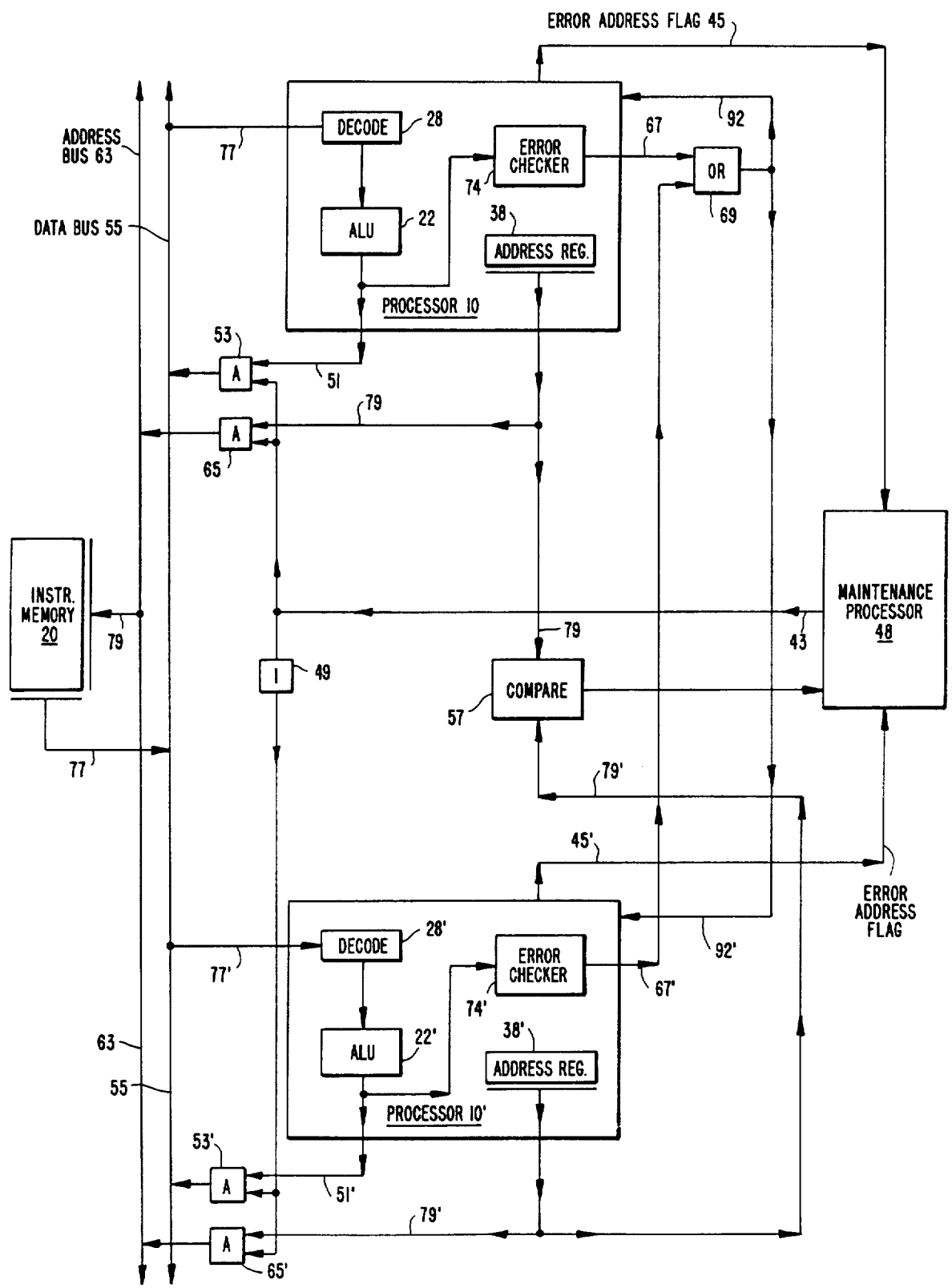
FIG. 3 shows a logic block diagram of a dual redundant processor configuration.

FIG. 3 shows a dual redundant processor configuration. The processor 10 of FIG. 1 is shown in FIG. 3 and an identical processor 10' is also shown, both coupled to a main system data bus 55 and address bus 63 and both sharing the same instruction memory 20. It is an objective of this feature of the invention to swap the master or active processor from the first processor 10 to the second processor 10' at the occurrence of a signal on the error address flag line 45 of the processor 10, and vice versa. As can be seen in FIG. 3, a maintenance processor 48 has an input connected to the error address flag 45 from the first processor 10 and the second input connected to the error address flag 45' from the second processor 10'. The maintenance processor 10 will decide which processor 10 or 10' is to be the active processor for the main system data bus 55 and address bus 63. The maintenance processor 48 has an output line 43 which is coupled to a first AND gate 53 which has a second input connected to the data output 51 of the ALU 22 of the processor 10. When the maintenance processor selects the first processor 10 as the master processor to be connected to the main system bus 55, it outputs an enabling signal on line 43 which satisfies the AND gate 53, thereby coupling the ALU output line 51 to the main system data bus 55. Alternately, if an error address flag signal on line 45 from the processor 10 occurs, the maintenance processor will remove the enable signal from the output line 43 and this, when passing through the inverter 49, provides an enabling signal to the AND gate 53', thereby coupling the output line 51' from the ALU 22 in the processor 10' to the main system data bus 55, while disabling the AND gate 53 which interrupts the coupling of the processor 10 to the main system data bus 55. In this manner, the maintenance processor 48 can perform a swapping operation between the dual redundant processors 10 and 10'.

Another feature of the invention is shown in FIG. 3, the comparison of the contents of the address register 38 in the processor 10 with the contents of the address register 38' in the processor 10' by means of the comparator 57. The comparator 57 has an output connected to the maintenance processor 48. If the current addresses in the address registers 38 or 38' are not the same, then the same instructions would not be accessed on output 77 from the instruction memory 20. This would indicate that any resultant error which is detected by the error checkers 74 or the error checker in the processor 10' would be the result of malfunction in the checkpoint retry mechanism itself. If there is a noncompare in the address registers 38 and 38' detected by the comparator 57, the maintenance processor 48 will not execute a retry operation. Alternately, if however there is an error detected by the error checker 74 in the processor 10 or in the corresponding error checker 74' in the processor 10' producing respective signals on the error address flag lines 45 or 45', then retry operations will take place, as has been previously described.

FIG. 3 also shows that the particular processor either 10 or 10' which is selected by the maintenance processor as the master, will be the processor whose address register contains the effective address which is applied to the instruction memory 20. This is done by having the output of the address register 38 connected through an AND gate 65 to the address bus 63 which is connected to the address input 79 of the instruction memory 20. The AND gate 65 is enabled in the same manner as is the AND gate 53 previously described, by the enable line from the maintenance processor 48. Similarly, for the processor 10', the address register 38' has an output connected through an AND gate 65' to the address bus 63 and the AND gate 65' is satisfied only when the AND gate 65 corresponding to the processor 10 is not satisfied. Thus, only the active processor 10 or 10' has its address register effectively connected to the address input 79 of the instruction memory 20 through the address bus 63.

. Another feature shown in FIG. 3 is that the error checker 74 in the processor 10 who has an output 67 connected to an OR gate 69 and the corresponding output 67' of the error checker 74' in the processor 10' is also connected to the input of the OR gate 69. The output of the OR gate 69 is the line 92 which, as can be seen in FIG. 1, is the error signal line which is shown and exists for both processor 10 and processor 10'. When either one of the processors 10 or 10' has its respective error checkers 74 or 74' detect an error from the respective ALUs 22 or 22', the OR gate 69 will produce a signal 92 which causes the instruction retry mechanism for both processors 10 and 10' to be initiated. In this manner a full synchronization of instruction retry operations can be maintained for the dual redundant processors 10 and 10'.

OPERATION OF THE INVENTION

Figure 4:
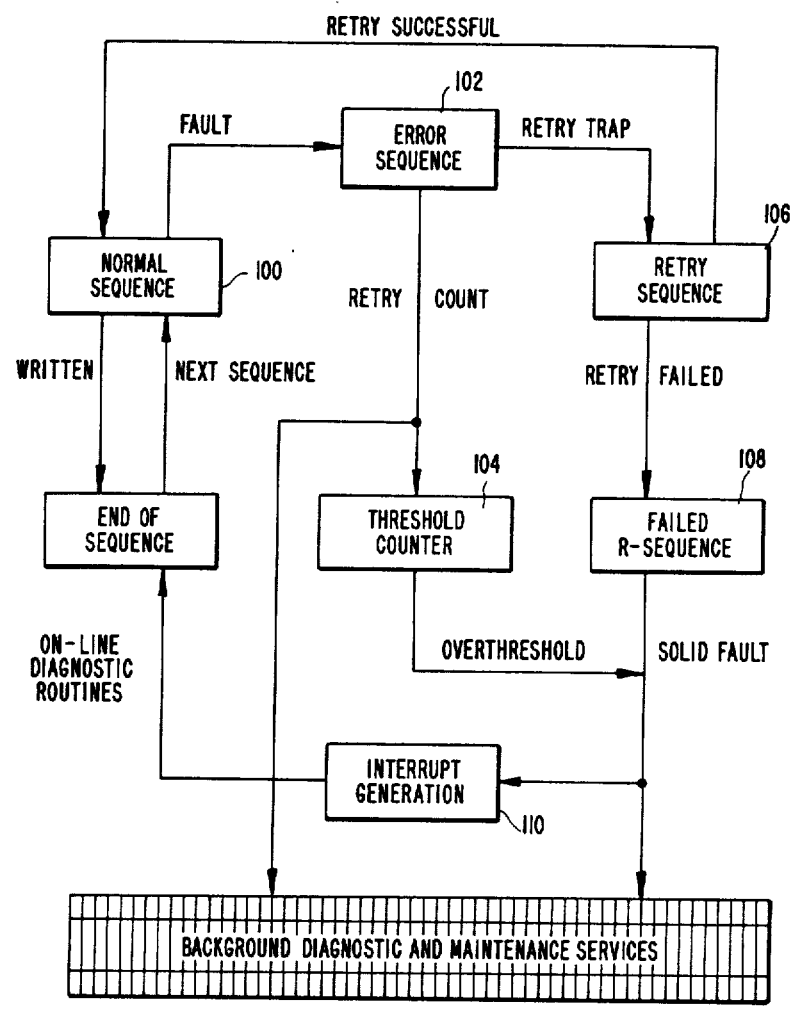
FIG. 4 illustrates a state diagram of the checkpoint retry sequences.

FIG. 4 describes a state diagram of the checkpoint retry sequences both independent of and in relation with background diagnostic and maintenance services. A normal sequence 100 in FIG. 4 is defined as the execution of a single instruction.

An error sequence 102 in FIG. 4 is defined as the error management actions taken following detection of an error. Typically, a detected fault activates a retry trap. Then the retry acknowledge initiates a restoration sequence. If the error is non-solid, the threshold counter 104 is updated. The counter may be used as an on-line indication of the processor performance. Error syndrome data will also be reported via an on-chip-monitor (OCM) to a diagnostic-and-maintenance-device (D×MD) for logging and thresholding. The saved checkpoint is then unloaded and single-stepped as part of the retry sequence.

A retry sequence 106 in FIG. 4 is defined as the execution of a single instruction in single-step mode following the restoration phase. Error detection in this phase will result in the identification of the failed instruction. Successful execution of this sequence will establish a new checkpoint with the next instruction before resuming normal execution.

A failed sequence 108 in FIG. 4 is the result of a solid failure or the faulty execution of a retry sequence. The instruction which was executing during the error will be reported via the OCM to the DxMD for logging and higher-level recovery actions. Single-step mode is reset, fault status will be reported, retry trap is deactivated, and retry acknowledge is activated. Then the system will generate an interrupt to invoke the software-controlled recovery actions. In the case of a single event upset (SEU), transient errors may experience a long duration which results in multiple nested interrupts. The software-controlled recovery actions will function as an upset event delay which can prevent further damage to operational resources.

An interrupt sequence 110 in FIG. 4 is triggered by a solid fault or excessive retries (resulting in an over threshold condition) to invoke the software-controlled recovery, which may be either on-line or background controlled. This also allows the processor to further delay operational processing with nested interrupts during a SEU (until the current SEU is cleared) to protect operational resources from erratic executions.

Figure 5:
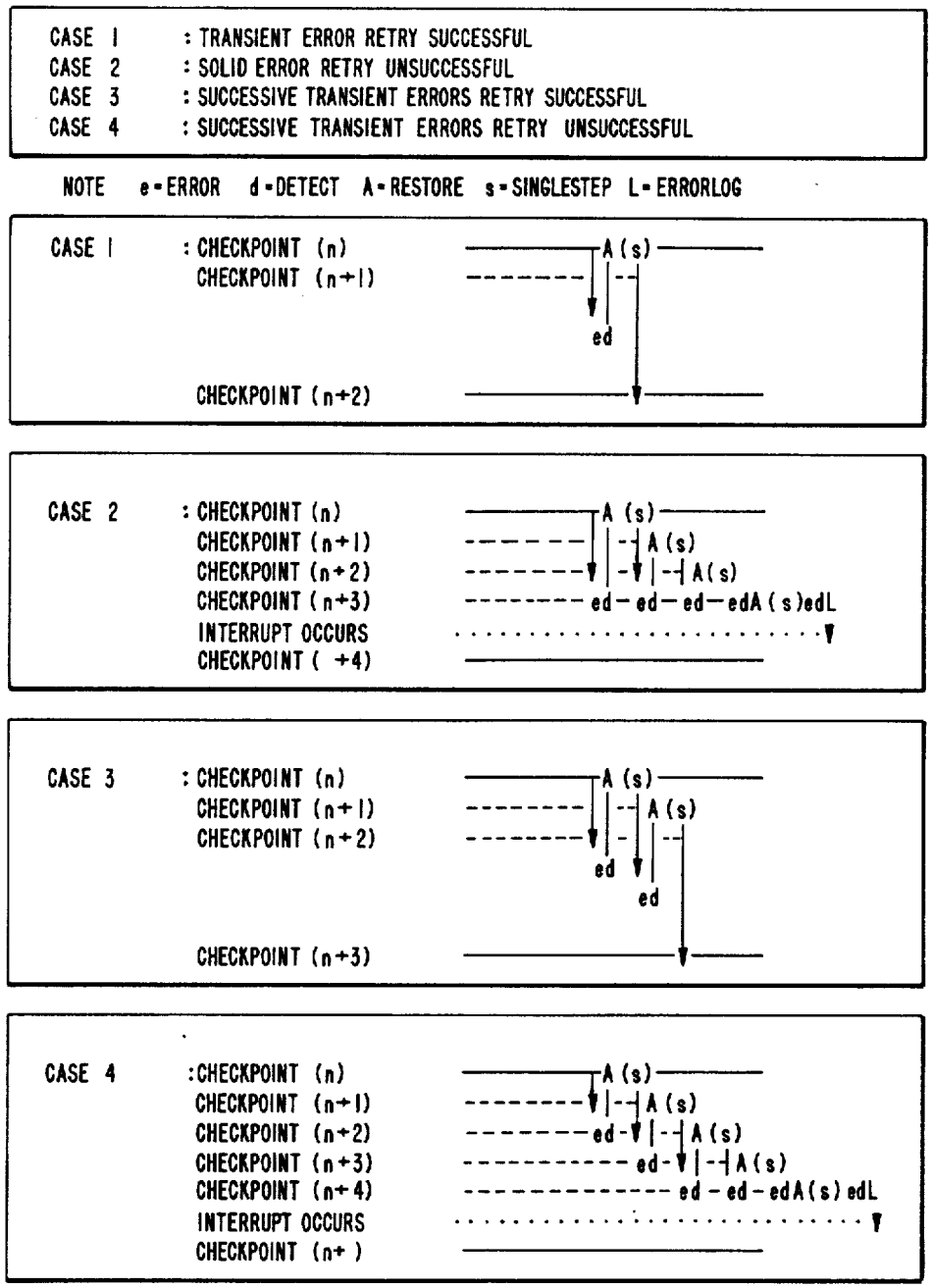
FIG. 5 illustrates four different case scenarios for checkpoint retry.

Four different cases of checkpoint retry scenarios are described in FIG. 5. Typically, there are four cases where transient faults occur between "writes" due to the nature of continuous hardware checkers. Recurrence of the same transient fault over a number of retry attempts results in a solid fault (cases 2 and 4). Multiple transient faults are retried in a progressive manner such that recurrence of faults is gradually eliminated by incremental checkpoints once the single stepping operation has completed without error (cases 1 and 3). These scenarios describe the adaptive characteristic of checkpoint retry strategy in handling fault duration, fault isolation, and fault identification. Case 1 depicts the recovery of a single transient fault with a single retry sequence that results in a full recovery. Case 2 depicts the recovery of a single solid fault with multiple retry sequences that results in an interrupt to initiate next level recovery with the error information and the machine state just before the error occurrence. Case 3 depicts the recovery of multiple transient faults with a multiple retry sequence that results in a progressive recovery similar to a short duration SEU. Case 4 depicts the recovery of multiple transient faults with multiple retry sequences that results in an interrupt to initiate next level recovery with the error information and the machine state just before the error occurrence. This also describes some aspects of a long duration SEU.

Although a specific embodiment of the invention has been disclosed, it will be understood by those having skill in the art that changes can be made to that specific embodiment without departing from the spirit and scope of the claims.

What is claimed is:

1. In a data processor including an instruction memory containing a sequence of executable instructions, and an arithmetic logic unit which operates in response to said instructions to carry out arithmetic and logical operations, an improved checkpoint retry mechanism, comprising:

an instruction decoder having an input coupled to an output of said instruction memory, for decoding instructions accessed therefrom, including a write decode output, an interrupt decode output, and an interrupt return decode output;

said instruction memory coupled to an address register for storing the address of the next instruction to be accessed therefrom;

a checkpoint address register being coupled to said write decode output of said instruction decoder for storing the address of the first instruction following a write instruction accessed from said instruction memory, as a first type checkpoint address;

said checkpoint address register being coupled to said interrupt decode output of said instruction decoder, for enabling, the address of a first occurring instruction in an interrupt service routine called by an interrupt instruction to be loaded into said checkpoint address register as a second type checkpoint address in response to accessing said interrupt instruction from said instruction memory;

said checkpoint address register being coupled to said instruction return decode output of said instruction decoder, for loading a first occurring instruction in an interrupted program after the occurrence of an interrupt instruction, into said checkpoint address register as a third type checkpoint address, in response to accessing an interrupt return instruction from said instruction memory;

an error checker having an input coupled to an output of said arithmetic logic unit, for detecting errors occurring in said arithmetic logic unit;

transfer means coupled to an output of said checkpoint address register and coupled to an output of said error checker, for transferring the contents of said checkpoint address register to said instruction memory address register in response to said error checker detecting an error in the operation of said arithmetic logic unit, the resulting contents of said instruction memory address register becoming the checkpoint address for retrying the sequence of instructions following said checkpoint address value, in response to the detection of said error;

whereby checkpoint addresses are automatically determined to enable the retry of instruction sequences in response to the detection of an error.

2. The apparatus of claim 1 in which said arithmetic logic unit has an associated status register for storing the current status thereof, the improved checkpoint retry mechanism which further comprises:

a shadow status register coupled to said instruction decoder for storing the contents of said status register in response to a new checkpoint address value being stored in said checkpoint address register;

said shadow status register having an output thereof coupled to an input of said status register, for transferring the contents of said shadow status register to said status register when said error checker detects the occurrence of an error in said arithmetic logic unit.

3. The apparatus of claim 1 in which said arithmetic logic unit has an associated plurality of general purpose registers for storing current operand and address values, the improved checkpoint retry mechanism which further comprises:

a plurality of shadow general purpose registers coupled to said instruction decoder for storing the contents of said plurality of general purpose registers in response to a new value for said checkpoint address being stored in said checkpoint address register;

said shadow general purpose registers having an output coupled to an input of said general purpose registers for transferring the contents of said shadow general purpose registers to said general purpose registers in response to said error checker detecting the occurrence of an error in said arithmetic logic unit.

4. The apparatus of claim 1 which further comprises:

a single step instruction address incrementer coupled to said error detector and to said instruction memory address register, for sequentially incrementing the instruction memory address register and executing the instructions in a stepwise manner for a retry operation;

5. The apparatus of claim 1 which further comprises:

a second arithmetic logic unit having a control input coupled through a second instruction decoder to said instruction memory, and having its output coupled to a second error checker;

said second arithmetic logic unit executing the same sequence of instructions as said first arithmetic logic unit, simultaneously;

the output of said first error checker and the output of said second error checker being coupled to said transfer means, thereby enabling an error detected in either said first arithmetic logic unit or in said second arithmetic logic unit to initiate the retry of the sequence of instructions which follow the instruction in said instruction memory stored at said checkpoint address.

6. The apparatus of claim 5 wherein a second instruction memory address register is associated with said second arithmetic logic unit, for storing a second value of the instruction address associated with said second arithmetic logic unit;

an address comparator having a first input coupled to said first instruction address register associated with said first arithmetic logic unit and having a second input coupled to said second instruction address register associated with said second arithmetic logic unit, for detecting when said first and said second instruction address registers fail to have identical values for their respective addresses;

isolation and swapping means having a control input coupled to the output of said address comparator, for isolating said first arithmetic logic unit from said second arithmetic logic unit and performing validation tests thereon in response to said address comparator determining that said first and said second instruction address values are not identical.

7. In a data processor including an instruction memory containing a sequence of executable instructions, an arithmetic logic unit which operates in response to said instructions to carry out arithmetic and logical operations, a status register for storing the current status of the arithmetic logic unit, and a plurality of general purpose registers accessible by the arithmetic logic unit, for storing current operand and address values, an improved checkpoint retry mechanism, comprising:

an instruction decoder having an input connected to an output of said instruction memory, for decoding instructions accessed therefrom, including a write decode output, an interrupt decode output, and an interrupt return decode output, and further including an output connected to a control input of said arithmetic logic unit;

said instruction memory coupled to an address register for storing the address of the next instruction to be accessed therefrom;

a first two input AND gate having a first input connected to an output of said instruction memory address register and a second input connected to said write decode output of said instruction decoder;

a checkpoint address register having an input connected to the output of said first AND gate, for storing the address of the first instruction following a write instruction accessed from said instruction memory, as a first type checkpoint address;

said instruction memory address register having an input connected to an interrupt vector address means, for storing the address of the first instruction in a service routine which is pointed to by an interrupt instruction accessed from said instruction memory;

said first AND gate having said second input connected to said interrupt decode output of said instruction decoder, for enabling the address of a first instruction in said service routine which has been transferred from said interrupt vector address means to said instruction memory address register, to be loaded into said checkpoint address register as a second type checkpoint address in response to accessing an interrupt instruction from said instruction memory;

an interrupt return address stack for storing the address of a first instruction in an interrupted program which occurs after an interrupt instruction therein;

a second AND gate having a first input connected to an output of said address stack and a second input connected to said instruction return decode output of said instruction decoder, and an output connected to said checkpoint address register, for loading the first instruction in an interrupted program after the occurrence of an interrupt instruction, into said checkpoint address register as a third type checkpoint address, in response to accessing an interrupt return instruction from said instruction memory;

an error checker having an input connected to an output of said arithmetic logic unit, for detecting errors occurring in said arithmetic logic unit;

a third AND gate having a first input connected to the output of said checkpoint address register and a second input connected to an output of said error checker, for transferring the contents of said checkpoint address register to said instruction memory address register in response to said error checker detecting an error in the operation of said arithmetic logic unit, the resulting contents of said instruction memory address register being the checkpoint address for retrying the sequence of instructions following said checkpoint address value, in response to the detection of said error;

whereby checkpoint addresses are automatically determined to enable the retry of instruction sequences in response to the detection of an error.

8. The apparatus of claim 7 which further comprises:

a shadow status register for storing the contents of said status register when a new checkpoint address value is stored in said checkpoint address register;

a fourth AND gate having a first input connected to an output of said status register, a second input connected to said instruction decoder, and an output connected to an input of said shadow status register, for loading the contents of said status register into said shadow status register when said checkpoint address register has a new checkpoint address value stored therein;

said shadow status register having an output thereof coupled to an input of said status register, for transferring the contents of said shadow status register to said status register when said error checker detects the occurrence of an error in said arithmetic logic unit.

9. The apparatus of claim 7 which further comprises:

a plurality of shadow general purpose registers for storing the contents of said plurality of general purpose registers when a new value for said checkpoint address is stored in said checkpoint address register;

said shadow general purpose registers having an output coupled to an input of said general purpose registers for transferring the contents of said shadow general purpose registers to said general purpose registers in response to said error checker detecting the occurrence of an error in said arithmetic logic unit.

10. The apparatus of claim 7 which further comprises:

a single step instruction address incrementer having an output connected to said instruction memory address register, for sequentially incrementing the instruction memory address register and executing the instructions in a stepwise manner for a retry operation.

11. The apparatus of claim 7 which further comprises:

a second arithmetic logic unit having a control input coupled through a second instruction decoder to said instruction memory, and having its output connected to a second error checker;

said second arithmetic logic unit executing the same sequence of instructions as said first arithmetic logic unit, simultaneously;

the output of said first error checker and the output of said second error checker being connected through an OR logic function to said third AND gate, thereby enabling an error detected in either said first arithmetic logic unit or in said second arithmetic logic unit to initiate the retry of the sequence of instructions which follow the instruction in said instruction memory stored at said checkpoint address.

12. The apparatus of claim 11 wherein a second instruction memory address register is associated with said second arithmetic logic unit, for storing a second value of the instruction address associated with said second arithmetic logic unit;

an address comparator having a first input connected to said first instruction address register associated with said first arithmetic logic unit and having a second input connected to said second instruction address register associated with said second arithmetic logic unit, for detecting when said first and said second instruction address registers fail to have identical values for their respective addresses;

isolation and swapping means having a control input connected to the output of said address comparator, for isolating said first arithmetic logic unit from said second arithmetic logic unit and performing validation tests thereon in response to said address comparator determining that said first and said second instruction address values are not identical.

* * * * *